(12) United States Patent
DeGrendel

(10) Patent No.: US 12,344,194 B2
(45) Date of Patent: Jul. 1, 2025

(54) SYSTEMS AND METHODS FOR ACCESSING A VEHICLE WITH BIOMETRIC KEY

(71) Applicant: FCA US LLC, Auburn Hills, MI (US)

(72) Inventor: Glen A DeGrendel, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 203 days.

(21) Appl. No.: 18/180,224

(22) Filed: Mar. 8, 2023

(65) Prior Publication Data

US 2024/0300446 A1   Sep. 12, 2024

(51) Int. Cl.
| | | |
|---|---|---|
| B60R 25/25 | (2013.01) | |
| B60R 25/30 | (2013.01) | |
| G06V 10/94 | (2022.01) | |
| G06V 40/16 | (2022.01) | |

(52) U.S. Cl.
CPC ............ *B60R 25/25* (2013.01); *B60R 25/305* (2013.01); *G06V 10/95* (2022.01); *G06V 40/172* (2022.01)

(58) Field of Classification Search
CPC ...................................................... B60R 25/25
See application file for complete search history.

(56) References Cited

U.S. PATENT DOCUMENTS

| | | | | |
|---|---|---|---|---|
| 7,167,083 | B2 * | 1/2007 | Giles ....................... | B60R 25/00 340/426.36 |
| 8,368,522 | B1 * | 2/2013 | Kralj ........................ | B60R 25/10 340/426.21 |
| 8,937,527 | B2 * | 1/2015 | Lambrou ................ | G08C 17/02 340/5.2 |
| 9,767,633 | B2 * | 9/2017 | Pramudji ............ | G07C 9/00944 |
| 2021/0319214 | A1 * | 10/2021 | Lee ........................ | G06V 40/172 |
| 2022/0108120 | A1 * | 4/2022 | Van Wiemeersch ......... | G07C 9/00563 |
| 2022/0348164 | A1 * | 11/2022 | Manickam .............. | B60R 25/31 |

\* cited by examiner

*Primary Examiner* — Travis R Hunnings
(74) *Attorney, Agent, or Firm* — Jeremy J. Klobucar

(57) ABSTRACT

A biometric authentication system and related method includes an activation component, a camera and a controller. The activation component can be configured to receive an input from a prospective user of the vehicle and activate the biometric authentication system based on the input satisfying the input criteria. The camera can be configured to acquire an image of the prospective user subsequent to activation of the biometric authentication system. The controller can be configured to (i) store an image of the at least one preauthorized user of the vehicle, (ii) compare an acquired image of the prospective user with an image of the at least one preauthorized user; and (iii) unlock a door of the vehicle based on the image of the prospective user successfully matching an image of at least one preauthorized user.

14 Claims, 3 Drawing Sheets

SYSTEMS AND METHODS FOR ACCESSING A VEHICLE WITH BIOMETRIC KEY

FIELD

The present application generally relates to gaining access to a vehicle in emergency situations where primary access is unavailable and, more particularly, to systems and methods for accessing a vehicle with a biometric key.

BACKGROUND

Some vehicles include passive entry systems that allow a user to unlock the vehicle remotely such as from a key fob or smart phone. Key fobs can be configured to unlock the vehicle by pushing a button on the key fob, or may be equipped with a proximity sensor that authenticates the user for permitting access to the vehicle. In some instances, however, a user may not be able to unlock the vehicle by such conventional means, for example, when a key, key fob or smart phone is unavailable due to certain circumstances. Accordingly, while conventional systems for unlocking a vehicle do work well for their intended purpose, there exists an opportunity for improvement in the relevant art.

SUMMARY

In accordance with one example aspect of the invention, a biometric authentication system for a vehicle is provided. The biometric authentication system includes an activation component, a camera and a controller. The activation component can be configured to receive an input from a prospective user of the vehicle and activate the biometric authentication system based on the input satisfying the input criteria. The camera can be configured to acquire an image of the prospective user subsequent to activation of the biometric authentication system. The controller can be configured to (i) store an image of the at least one preauthorized user of the vehicle, (ii) compare an acquired image of the prospective user with an image of the at least one preauthorized user; and (iii) unlock a door of the vehicle based on the image of the prospective user successfully matching an image of at least one preauthorized user.

In addition to the foregoing, the activation component can be a door handle of the vehicle. In one example, the input criteria can comprise a cycling of the door handle a predetermined amount of times. In another example, the input criteria can comprise a completion of a sequence of cycles. In example, the sequence of cycles can comprise (i) three lifts of the door handle; (ii) a pause for a predetermined amount of time subsequent to the three lifts; (iii) four lifts of the door handle; (iv) a pause for a predetermined amount of time subsequent to the four lifts; and (v) two lifts of the door handle.

In addition to the foregoing, the controller can be further configured to send a signal to an audible device of the vehicle upon successful activation of the biometric authentication system. The camera can be a rear facing camera disposed on one of the decklid, a rear hatch and a liftgate of the vehicle.

In addition to the foregoing, the controller can be configured to wirelessly communicate the acquired image of the prospective user with a server.

In accordance with another example aspect of the invention, a method for gaining access to a vehicle using a biometric authentication system of the vehicle is provided. In one example implementation, the method includes receiving, at a controller, an input from an activation component. The controller determines whether the input satisfies an input criteria. The biometric authentication system is activated based on the input satisfying the input criteria. A biometric image of the prospective user is acquired at a camera of the biometric authentication system. The biometric image of the prospective user is compared with a preauthorized image of a preauthorized user. A determination is made whether the biometric image of the prospective user matches the image of the preauthorized user. Access to the vehicle is permitted based on the biometric image of the prospective user matching the image of the preauthorized user.

In addition to the foregoing, the method can further include acquiring the preauthorized image of the preauthorized user. The preauthorized image can be stored at the controller. Receiving an input from an activation component can comprise receiving the input from a vehicle door handle indicative of the vehicle door handle cycling. In one example, the input criteria can comprise a cycling of the door handle a predetermined amount of times. In another example, the input criteria can comprise completion of a sequence of cycles. In examples, the sequence of cycles can include (i) three lifts of the door handle; (ii) a pause for a predetermined amount of time subsequent to the three lifts; (iii) four lifts of the door handle; (iv) a pause for a predetermined amount of time subsequent to the four lifts; and (v) two lifts of the door handle.

In addition to the foregoing, the method can further include sending a signal to an audible device of the vehicle upon successful activation of the biometric authentication system. The method can further include wirelessly communicating the acquired image of the prospective user to a server. The biometric image of the prospective user and the preauthorized image of a preauthorized user can be compared at the server.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, there exists an opportunity for improvement in the art of vehicle accessibility when conventional means are unavailable. For example, in some instances a vehicle owner may not be able to access a locked vehicle due to not having conventional vehicle access tools including a key, key fob or connected smart phone. The improved systems and methods of the present disclosure leverage components and systems already available on the vehicle to securely authenticate the individual wishing to gain access to the vehicle. In this regard, the systems and methods herein provide a robust and cost effective solution to permit vehicle access, in a secure, pre-authorized manner, without adding supplemental hardware to the vehicle.

Figure 1:
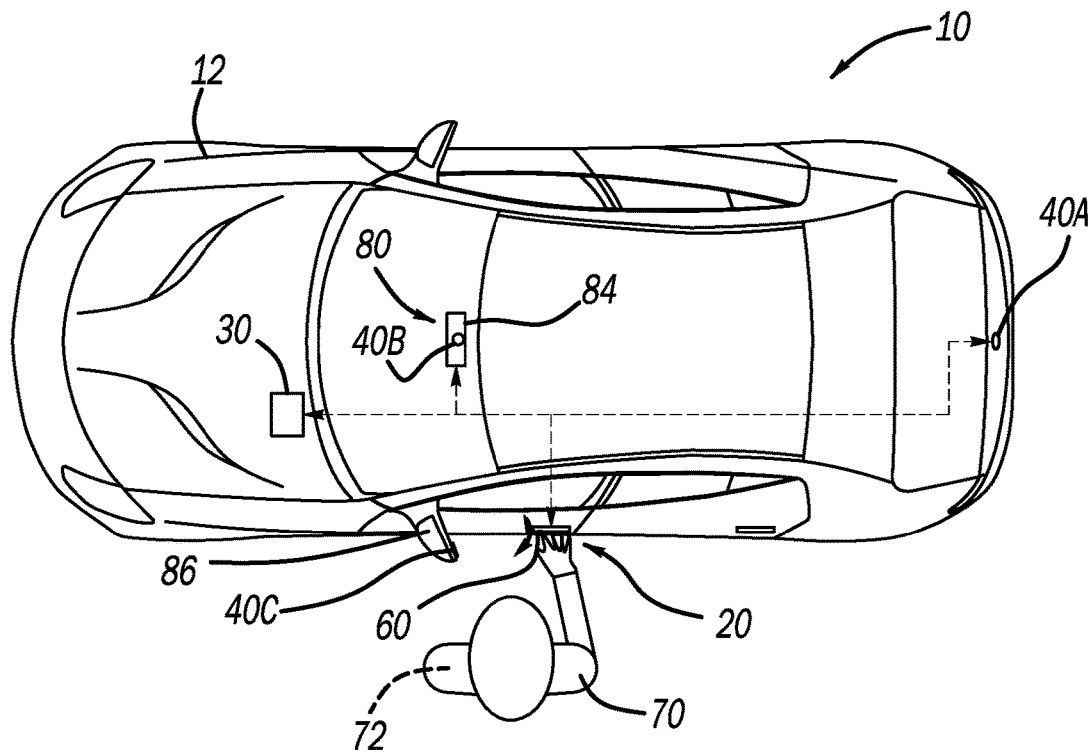
FIG. 1 is a functional block diagram of an example biometric authentication system according to the principles of the present disclosure, the biometric authentication system shown with a prospective user providing input to an activation component.
Figure 4:
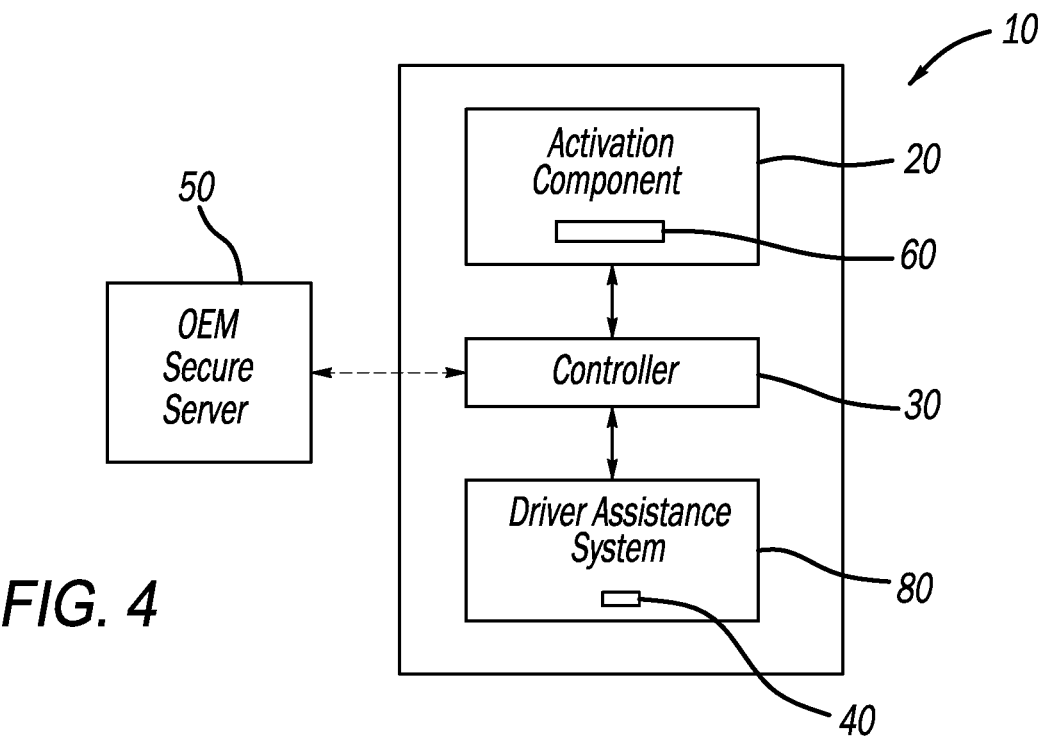
FIG. 4 is a functional block diagram of the example biometric authentication system of FIG. 1 shown having remote communication to an original equipment manufacturer (OEM) server according to principles of the present disclosure.

Accordingly, and with reference to FIG. 1, improved systems and methods for gaining access to a vehicle in emergency situations where primary access is unavailable are presented. In FIG. 1, an example biometric authentication system 10 is illustrated. The biometric authentication system 10 is generally configured on a vehicle 12 having an activation component 20, a controller 30, and at least one camera 40. In examples, the biometric authentication system 10 can be configured to communicate with an OEM secure server 50 (FIG. 4).

The activation component 20 according to one example includes a vehicle door handle 60. In examples, a sequence of user inputs to the vehicle door handle 60 activates the biometric authentication system 10. In advantages, the biometric authentication system 10 draws minimal power when the ignition is off as compared to other systems that may employ active sensors that add cost to the vehicle and are always active and drawing battery power.

By way of example only, the biometric authentication system 10 can be configured to be activated only upon a successful triggering by the activation component 20. In the example herein, the activation component 20 can activate the biometric authentication system 10 upon cycling of the door handle 60 or upon a completion of a sequence of cycles. For example, the biometric authentication system 10 can be activated by a user 70 based on the completion of a particular sequence such as: (i) three lifts of the door handle 60; followed by (ii) a pause for a predetermined amount of time; followed by (iii) four lifts of the door handle 60; followed by (iv) a pause for a predetermined amount of time; followed by (v) two lifts. In other scenarios, the biometric authentication system 10 can be activated based on lifting the door handle 60 beyond a threshold of cycles. As used herein the term cycle is used to denote the actuating (e.g., lifting) of the door handle 60 a predetermined amount. For example only, the biometric authentication system 10 can be activated based on lifting the door handle 60 five times. Other authentication sequences and/or thresholds are contemplated.

The controller 30 can include a memory storing processor-executable instructions for performing the intended functionality of the controller 30. The controller 30 can include one or more processors that execute the processor-executable instructions. The controller 30 may be a vehicle controller unit for the entire vehicle 12 or may be a controller for a subsystem of the vehicle, e.g., the vehicle security system. The controller 30 can receive signals from the activation component 20 such as a cycle signal based on lifting of the door handle 60.

In examples, the controller 30 can store a user profile having a preregistered and authenticated biometric profile. In this regard, a vehicle owner or users approved by the vehicle owner can set up user profiles that are saved in the controller 30 and/or at servers 50 as described herein. An owner or user 70 can be prompted to input their facial image such that it can be stored by the controller 30 as a preauthorized user. A facial image can be taken by one of the vehicle cameras 40 or can be uploaded externally such as by a smartphone. The controller 30 will assign the facial image as an approved user of the vehicle 10. Additional approved user profiles can be uploaded and saved at the controller 30 as approved users of the vehicle.

The techniques of the present disclosure provide for the creation and management of user accounts that include the preauthorized users of the vehicle 10. The user accounts and preauthorized user profiles can be stored at the controller 30, and/or at one or more secure server(s) 50 (e.g., in the cloud). The server(s) 50 can be owned and operated by a particular vehicle original equipment manufacturer (OEM) and are only accessible to authorized users, such as a particular type or brand of vehicle. These user accounts are able to store and manage authenticated user profiles.

The vehicle 12 can be equipped with an advanced driver assistance system 80 that comprises the cameras 40. In examples, the cameras, collectively identified at 40 can include a rear camera 40A, a front facing camera 40B and/or a side facing camera 40C. The rear camera 40A can be a rear deck lid camera for a sedan, a rear hatch camera for a sport utility vehicle or a rear lift gate camera for a pickup truck. Other mounting locations are contemplated for the rear camera 40A. In the example shown, the front facing camera 40B can be disposed on a rear view mirror 84 of the vehicle. In other examples, the front facing camera can be disposed on a front grille of the vehicle. Other mounting locations are contemplated for the front facing camera 40B. The side facing camera 40C can be disposed on a side view mirror 86. The cameras 40 are configured to communicate image data to the controller 30. In general, a camera of the cameras 40 can capture an image for biometric authentication upon successful triggering of the biometric system 10 by the activation component 20. The cameras 40 communicate the captured image to the controller 30 where it can be compared with any preauthorized biometric data. According to examples, the camera 40 is configured to capture a facial image of a prospective user 70 whereby facial recognition software housed in the controller 30 (and/or at the server 50) can compare a facial image of a candidate user of the vehicle 10 to a preauthorized facial image of the vehicle owner (or users pre-authorized by the vehicle owner).

Figure 5:
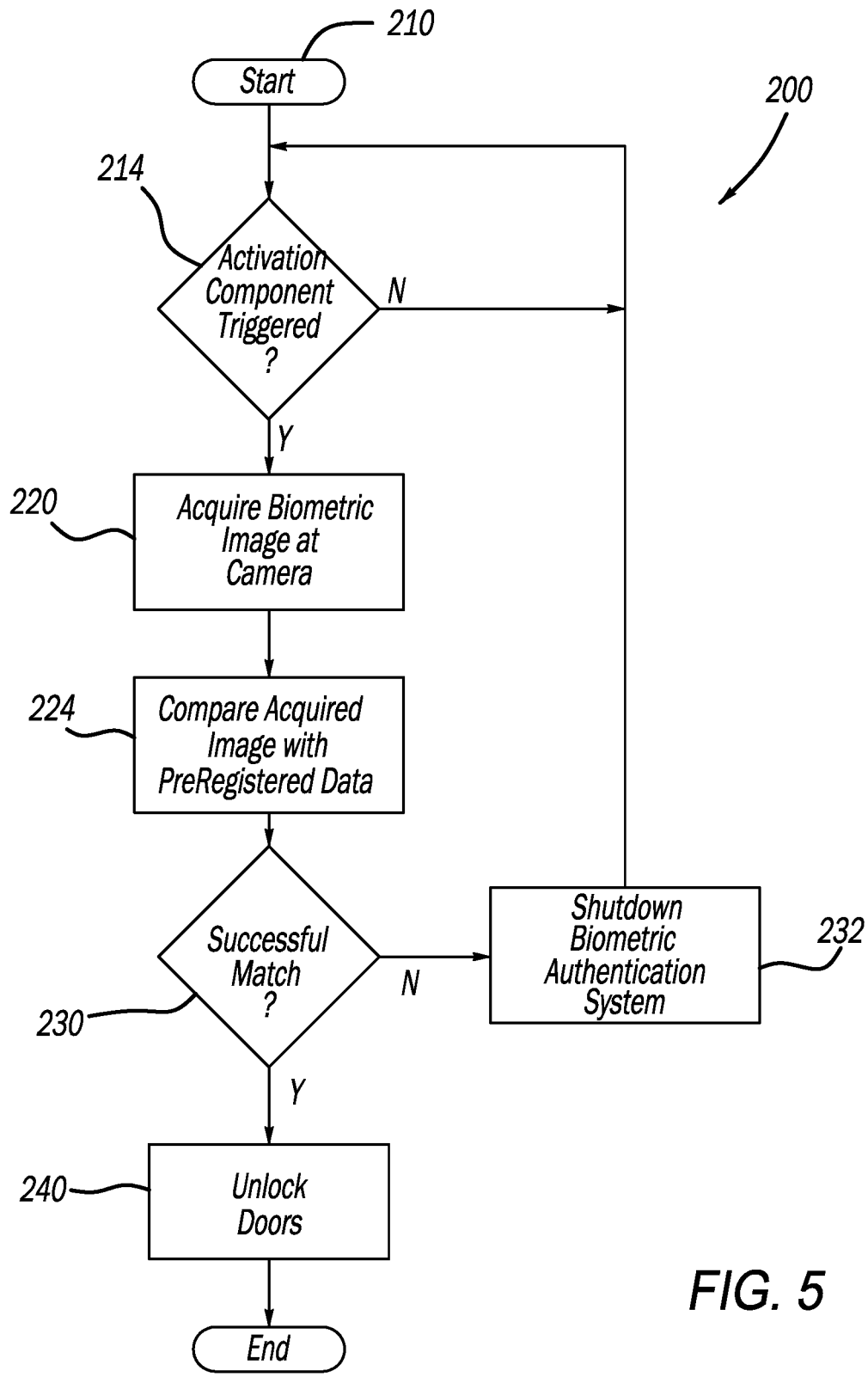
FIG. 5 is a flow diagram of an example method of gaining access to a vehicle using the biometric authentication system of FIG. 1 according to the principles of the present disclosure.

Referring now to FIG. 5, a flow diagram of an example method 200 of gaining access to a vehicle in situations where primary access is unavailable according to the principles of the present disclosure is illustrated. The method begins a 210. At 214, the controller 30 determines whether the activation component 20 has triggered the biometric system 10. As described above, the activation component 20 can include the door handle 60.

In examples, the biometric system 10 can be triggered upon completion of a sequence of cycles of the door handle 60. In other examples, the biometric system 10 can be triggered upon cycling of the door handle 60 a number of times that reaches a threshold (e.g., five times up and down).

If the biometric system 10 is triggered, the biometric authentication system 10 is activated and control proceeds to 220. If the activation component 60 does not successfully trigger the biometric system 10 by not satisfying the predetermined criteria, control loops to 214.

Figure 2:
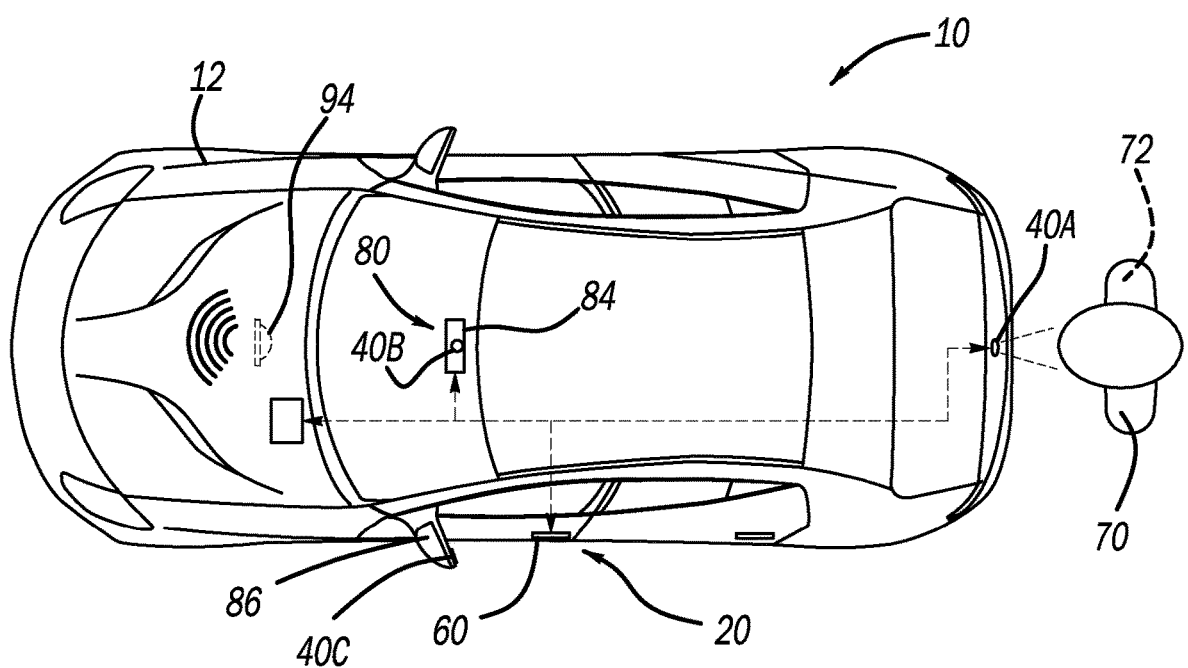
FIG. 2 is a functional block diagram of the example biometric authentication system of FIG. 1 shown with a camera acquiring a facial image of a prospective user according to principles of the present disclosure.
Figure 3:
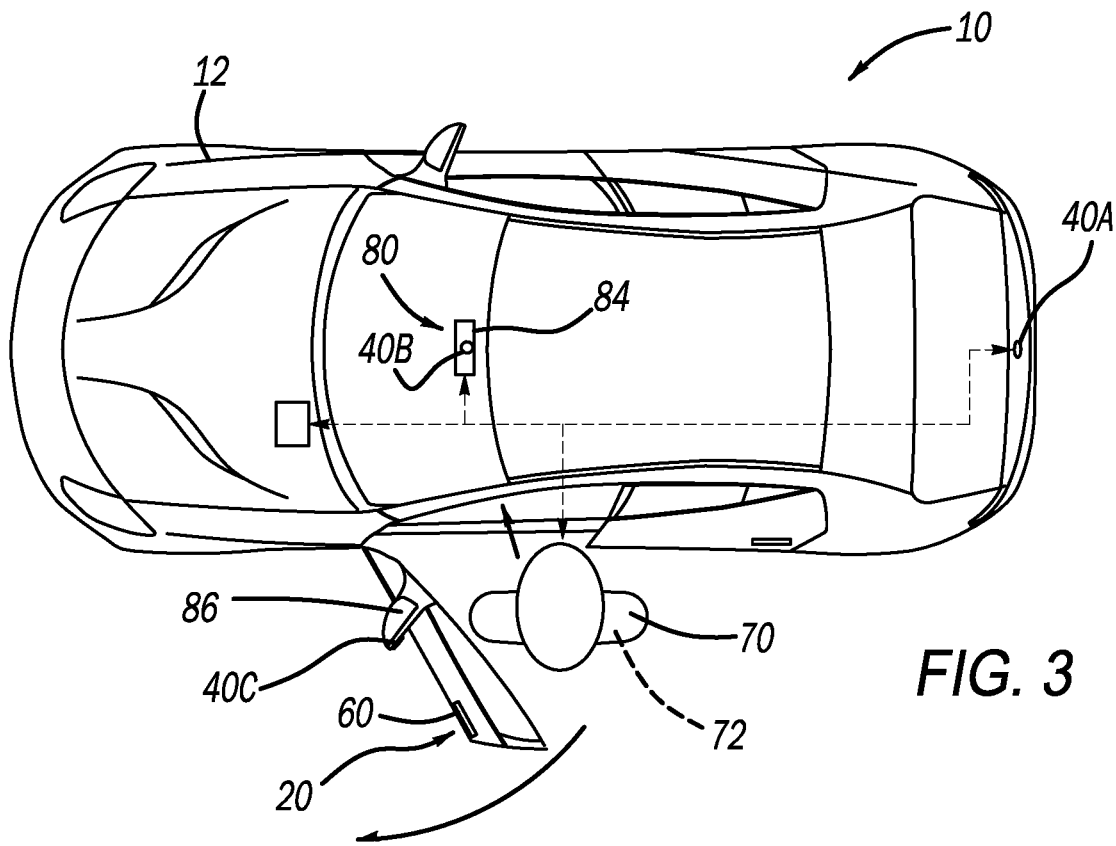
FIG. 3 is functional block diagram of the example biometric authentication system of FIG. 1 shown with the vehicle doors unlocked subsequent to the biometric authentication system successfully authorizing the prospective user to gain access to the vehicle.

If the activation component 60 has successfully triggered the biometric system 10 by satisfying the predetermined criteria, control acquires a biometric image of a prospective user 72 at the camera 40 at step 220. In the example, shown, the prospective user 72 moves into viewable position by the rear camera 40A. It is appreciated that any of the cameras 40 can be configured to acquire an image of the prospective user 72. In examples, the controller 30 can send a signal to an audible device 94 of the vehicle 10 upon successful triggering of the biometric system 10 indicating to the prospective user 70 that the camera 40 is ready to acquire an image. An exemplary step of acquiring a biometric image 220 is shown at FIG. 2.

Once the biometric image of the prospective user 72 has been acquired, the acquired image of the prospective user 72 is compared with preregistered image data of the authorized user(s) at 224. As explained herein, the vehicle owner or user 70 has already input their facial image and facial images of any prospective users of the vehicle 10 they authorize to use the vehicle 10. At 230 control determines whether the acquired image of the prospective user is a successful match with any of the preauthorized images. If the match is unsuccessful, control shuts down the biometric authentication system 10 at 232 and loops to 214. If the match is successful, the controller 30 sends a signal to unlock the door handle 60 (or more generally the doors) at 240 thereby permitting access to the vehicle 10 by the prospective user 72. Control ends at step 240.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A biometric authentication system for a vehicle, the biometric authentication system comprising:
   an activation component, comprising a door handle, configured to receive an input from a prospective user of the vehicle and activate the biometric authentication system based on the input satisfying an input criteria, the input criteria comprising a completion of a cycling of the door handle a predetermined amount of times more than once to satisfy the cycling;
   a camera configured to acquire an image of the prospective user subsequent to activation of the biometric authentication system;
   a controller configured to:
   store an image of at least one preauthorized user of the vehicle;
   compare an acquired image of the prospective user with an image of the at least one preauthorized user; and
   unlock a door of the vehicle based on the image of the prospective user successfully matching an image of the at least one preauthorized user.

2. The biometric authentication system of claim 1 wherein the input criteria comprises a completion of a sequence of cycles of the door handle.

3. The biometric authentication system of claim 2 wherein the sequence of cycles comprises:
   three lifts of the door handle;
   a pause for a predetermined amount of time subsequent to the three lifts;
   four lifts of the door handle;
   a pause for a predetermined amount of time subsequent to the four lifts; and
   two lifts of the door handle.

4. The biometric authentication system of claim 1 wherein the controller is further configured to send a signal to an audible device of the vehicle upon successful activation of the biometric authentication system.

5. The biometric authentication system of claim 1 wherein the camera is a rear facing camera disposed on one of a decklid, rear hatch and liftgate of the vehicle.

6. The biometric authentication system of claim 1 wherein the controller is configured to wirelessly communicate the acquired image of the prospective user with a server.

7. A method for gaining access to a vehicle using a biometric authentication system of the vehicle, the method comprising:
   receiving, at a controller, an input from an activation component comprising a door handle;
   determining, at the controller, whether the input satisfies an input criteria, the input criteria comprising a completion of a cycling of the door handle a predetermined amount of times more than once to satisfy the cycling;
   activating the biometric authentication system based on the input satisfying the input criteria;
   acquiring a biometric image of a prospective user at a camera of the biometric authentication system;
   comparing the biometric image of the prospective user with a preauthorized image of a preauthorized user;
   determining if the biometric image of the prospective user matches the preauthorized image of the preauthorized user; and
   permitting access to the vehicle based on the biometric image of the prospective user matching the image of the preauthorized user.

8. The method of claim 7, further comprising:
   acquiring the preauthorized image of the preauthorized user; and
   storing the preauthorized image at the controller.

9. The method of claim 8 wherein the input criteria comprises a completion of a sequence of cycles of the door handle.

10. The method of claim 9 wherein the sequence of cycles comprises:
    three lifts of the door handle;
    a pause for a predetermined amount of time subsequent to the three lifts;
    four lifts of the door handle;
    a pause for a predetermined amount of time subsequent to the four lifts; and
    two lifts of the door handle.

11. The method of claim 7, further comprising:
sending a signal to an audible device of the vehicle upon successful activation of the biometric authentication system.

12. The method of claim 7, further comprising:
wirelessly communicating the acquired image of the prospective user to a server; and
wherein the biometric image of the prospective user and the preauthorized image of a preauthorized user are compared at the server.

13. The method of claim 7 wherein permitting access comprises:
unlocking a door of the vehicle.

14. The method of claim 7 wherein the biometric image comprises a facial image.

\* \* \* \* \*